United States Patent [19]

Schneider et al.

[11] 4,286,872

[45] Sep. 1, 1981

[54] OPTICAL CORRELATOR

[75] Inventors: Eckart Schneider, Wetzlar; Eckart Delingat, Nauborn, both of Fed. Rep. of Germany

[73] Assignee: Ernst Leitz Wetzlar GmbH, Fed. Rep. of Germany

[21] Appl. No.: 58,865

[22] Filed: Jul. 19, 1979

[30] Foreign Application Priority Data

Aug. 12, 1978 [DE] Fed. Rep. of Germany ....... 2835390

[51] Int. Cl.³ ........................... G01P 3/36; G01C 3/08
[52] U.S. Cl. ......................................... 356/28; 356/4; 356/373; 356/375; 356/386
[58] Field of Search .................... 350/181, 190; 356/4, 356/28, 373, 375, 386

[56] References Cited

U.S. PATENT DOCUMENTS

| | | | |
|---|---|---|---|
| 3,623,811 | 11/1971 | Lederer et al. | 356/4 |
| 3,781,110 | 12/1973 | Leitz et al. | 356/4 |
| 3,856,401 | 12/1974 | Heitmann et al. | 356/4 |
| 3,865,487 | 2/1975 | Andermo | 356/28 |
| 3,994,583 | 11/1976 | Hutchins | 356/28 |
| 4,071,297 | 1/1978 | Leitz et al. | 356/375 |

FOREIGN PATENT DOCUMENTS

| | | |
|---|---|---|
| 1237040 | 6/1971 | United Kingdom . |
| 1431788 | 4/1977 | United Kingdom . |
| 1485584 | 9/1977 | United Kingdom . |
| 1493963 | 12/1977 | United Kingdom . |

*Primary Examiner*—S. C. Buczinski
*Attorney, Agent, or Firm*—Schwartz, Jeffery, Schwaab, Mack, Blumenthal & Koch

[57] ABSTRACT

An optical correlator having an imaging system for the non-contact measuring of the velocity and/or direction of motion and/or the distance of an object, and comprising at least one grating structure having lines thereon mounted at least in the vicinity of the image plane of the imaging system and at least one photoelectric receiver arranged after the grating structure in the direction of the light, the receiver converting the modulated light fluxes resulting from the grating structure into electrical signals, the improvement comprising a supplemental structural device inserted between the imaging system and the grating structure of the correlator for transforming spatial frequencies contained in the image of an object.

5 Claims, 1 Drawing Figure

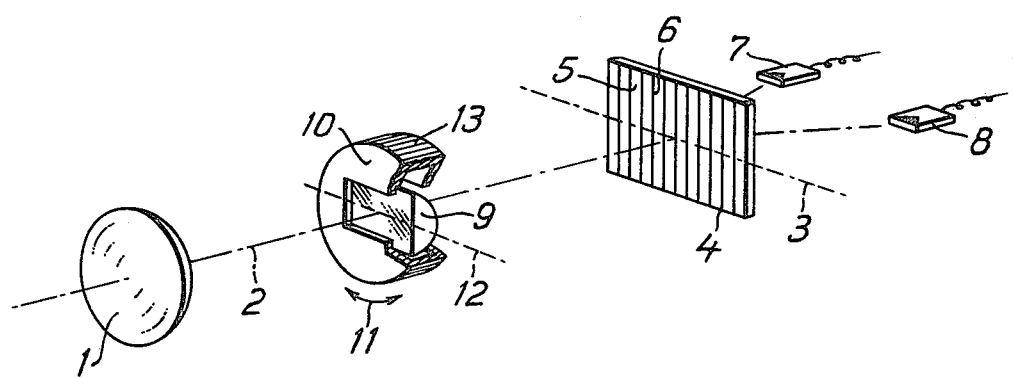

OPTICAL CORRELATOR

BACKGROUND OF THE INVENTION

The instant invention is in the field of optical correlators for use in the non-contact measurement of velocity and/or direction of motion and/or distance of an object. Such correlators generally comprise an imaging system having at least one grating structure mounted in the vicinity of the image plane of said system, at least one photoelectric receiver system arranged after the grating structure in the direction of the light for converting the modulated light fluxes resulting from the grating structure into electrical signals.

To use such an optical correlator, it is in most cases merely necessary to produce an image of the grating structure in a directional axis of the grating structure used in the analysis, preferably perpendicular to the direction of the lines of the grating. The quality of the image of the imaging system will be determined by the lattice constant of the analyzing grating structure, which acts as a spatial frequency filter.

It has been found that object structures with images smaller than one-half of the constant of the grating structures produced in the grating plane by the imaging system, are noticed in the signal generated by the electrical receiver system in the form of interfering harmonics, and that in the case of relatively coarse gratings the power of resolution of the imaging system does not provide adequate attenuation of these harmonics.

SUMMARY OF THE INVENTION

The object of the instant invention is therefore to improve the optical correlator so that object structures potentially generating interfering harmonic waves may be rendered largely ineffective with respect to the generation of interfering harmonic signals without appreciably affecting the fundamental wave of the signal.

This object is attained according to the invention by inserting into the path of the beam of the above-mentioned optical correlator and into its optical axis a supplemental structural device. Said supplemental structural device inserted in the above manner is placed between the imaging system of said optical correlator and its grating structure for matching the function of the distribution of the structural elements of the image of said object in said image plane with the function of the distribution of said grating structure by transforming in a given direction spatial frequencies contained in said image of said object.

With the said of such a measure, for instance a punctiform structural element of an object smaller than one-half of the constant of the grating and therefore causing interferring harmonies is suitably spread (transformed) into an elongated one.

From this it is comprehensible, such a transformation of spatial frequencies will result in improved elecrical signals.

It is possible that the inserted supplemental structural device will produce as a consequence of its position in the path of the beam, transformation of spatial frequencies in the direction of the lines of the grating structure or transversely to the grating line direction. When imaging in the direction of the grating structural lines, the image transverse to the grating structural lines will be determined only by spherical optics, while when the generation of the image is effected transversely to the grating structural lines, the focal length of the supplemental structural device must also be considered. In both cases, a line image will be produced from a point image.

According to another feature of the invention, the supplemental structural device transforming the spatial frequencies may be mounted rotatably around the optical axis of the optical correlator. An arrangement of this type renders it possible to vary the level of the spatial frequencies by the amount of rotation of the structural device inserted. It is advantageous in this connection to provide a suitably marked scale for the controlled rotation of the supplemental structural device. A cylindrical lens may be provided as the structural device transforming the spatial frequencies.

The invention is described hereinbelow with the aid of a schematic drawing illustrating the preferred embodiment.

DETAILED DESCRIPTION OF THE PREFERRED EMBODIMENT

In reference to the drawing there is shown an imaging system 1 having an optical axis 2. Perpendicularly to the optical axis 2 of imaging system 1 and at least in the vicinity of the image plane 3 thereof, is positioned a grating structure 4 with transparent and opaque lines 5 and 6 respectively placed perpendicularly to the optical axis 2. The grating structure 4 serves as a spatial frequency filter for the image projected thereon by the imaging system 1 of the object (not shown) to be measured. Light leaving the grating structure 4 impacts on the photoelectric receiver systems 7 and 8 which convert same into electrical signals.

The signals generated at the outputs of the receiver systems 7 and 8 comprise a signal component proportional to the velocity and/or the direction of motion and/or the distance of the object.

It is possible that with the optical correlator described heretofore, structures of the object to be measured which are reproduced at a scale smaller than corresponding to one-half of the grating constant become noticeable in the electrical signal generated by the photoelectric receiver systems 7, 8. These signals cause interference in the form of harmonic waves. In order to prevent this interference from taking place, a supplemental structural device transforming the spatial frequencies corresponding to these object structures is inserted in the path of the beam of the optical correlator. In the case illustrated, the supplemental structural device consists of a cylindrical lens 9, whereby the object may be reproduced as a function of the place or installation of the cylindrical lens 9, both astigmatically, and anamorphotically. Preferably, said reproduction takes place transversely to the lines 5 and 6 of the grating structure 4. In view of the present invention, transforming spatial frequencies means adapting structural details to the grating structure used, or in other words, very small object structures are coarsened with respect to the constant of the grating structure.

The line image of the object projected by the cylindrical lens 9, may, however, also be altered in relation to its inclination relative to the lines 5, 6 of the grating structure 4. For this purpose, as shown in the FIGURE, cylindrical lens 9 is supported on a mounting 10 carrying a scale 13, so that it is rotatable in the direction of the double arrow 11 around the axis 2 of the optical correlator. By rotating the mounting 10, the cylindrical lens 9 is turned in a definite manner around the axis 2 of the optical correlator and a resultant image point size is obtained relative to the perpendicular of the lines 5 and 6 of the grating structure 4. This resulting point size provides an identical supplemental broadening for all of the image points in the image of the object. The broadening may thus be preselected by the controlled rotation or positioning of the axis 12 to thereby determine the highest local frequency contained in the image of the object.

The foregoing description has been set forth solely as an example of the invention. Since modifications of the disclosed embodiment may occur to persons skilled in the art, the scope of the invention is to be limited solely by the scope of the appended claims.

We claim:

1. An optical correlator having an imagining system for the non-contact measuring of the velocity and/or direction of motion and/or the distance of an object, and comprising at least one grating structure having lines thereon mounted at least in the vicinity of the image plane of said imaging system and at least one photoelectric receiver arranged after the grating structure in the direction of the light, said receiver converting the modulated light fluxes resulting from the grating structure into electrical signals, the improvement comprising a supplemental structural device inserted between said imaging system and said grating structure of said correlator for matching the function of the distribution of the structural elements of the image of said object in said image plane with the function of the distribution of said grating structure by transforming spatial frequencies contained in the image of an object transversely to the direction of the lines of said grating structure; said matching resulting in improved electrical signals.

2. An optical correlator as recited in claim 1, wherein the supplemental structural device transforming the spatial frequencies is mounted rotatably around the optical axis of the optical correlator.

3. An optical correlator as recited in claim 2 further comprising a marked scale fixed to said rotatable supplemental structural device for controlling rotation of same.

4. An optical correlator as recited in claim 1, wherein said supplemental structural device comprises a cylindrical lens.

5. An optical correlator as recited in claim 1 wherein said supplemental structural device comprises a cylindrical lens.

* * * * *